(12) United States Patent
Katou

(10) Patent No.: US 6,359,556 B1
(45) Date of Patent: Mar. 19, 2002

(54) TIRE AIR PRESSURE MONITORING APPARATUS AND METHOD

(75) Inventor: Mitiya Katou, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 09/523,812

(22) Filed: Mar. 13, 2000

(30) Foreign Application Priority Data

Oct. 12, 1999 (JP) ............................................ 11-288973

(51) Int. Cl.[7] ........................... G08B 29/00; B60C 23/00
(52) U.S. Cl. ........................ 340/506; 340/539; 340/447; 73/146.5
(58) Field of Search ................................ 340/506, 539, 340/447, 442; 73/146.4, 146.5; 116/34 R

(56) References Cited

U.S. PATENT DOCUMENTS 4,319,220 A * 3/1982 Pappas et al. .............. 340/447
5,109,213 A * 4/1992 Williams .................... 340/447
5,661,651 A * 8/1997 Geschke et al. ............... 701/88

* cited by examiner

Primary Examiner—Donnie L. Crosland
(74) Attorney, Agent, or Firm—Nawrocki, Rooney & Sivertson, P.A.

(57) ABSTRACT

Each transmitter installed in tires on a vehicle generates a variable value, which is updated according to a predetermined sequence every time it sends data. The current value of the variable is transmitted to a receiver regularly along with other the information. The receiver determines whether any receptions have been skipped prior to the current reception based on whether or not the variable value included in the received data has been updated according to the sequence. The receiver judges that there is a communication failure when the number of skipped receptions is equal to or greater than an upper limit value and judges that there is no communication failure when the skipped reception number is less than the upper limit value. This permits easy and reliable detection of communication failures.

15 Claims, 6 Drawing Sheets

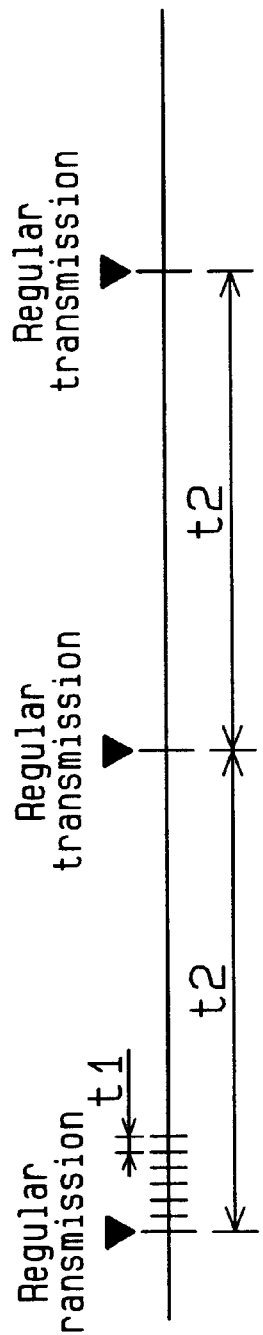
Fig.5(a) Regular transmission mode
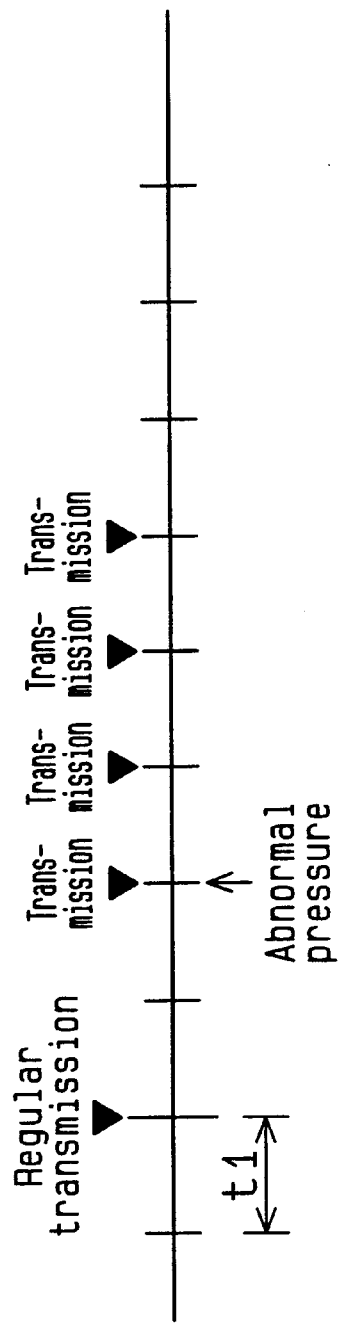
Fig.5(b) Abnormal transmission mode

Fig.8

| Transmitter | ID code | Current $C_2$ | Previous $C_2$ | E |
|---|---|---|---|---|
| #1 | 00···00 | 14 | 9 | 4 |
| #2 | 01···01 | 6 | 4 | 1 |
| #3 | 10···10 | 2 | 15 | 2 |
| #4 | 10···11 | 9 | 8 | 0 |

TIRE AIR PRESSURE MONITORING APPARATUS AND METHOD

BACKGROUND OF THE INVENTION

The present invention relates generally to an apparatus and method of monitoring the air pressures of tires on a vehicle. More particularly, this invention pertains to an air pressure monitoring apparatus having transmitters installed in the individual tires to wirelessly transmit data about the air pressures of the tires and a receiver mounted on the body frame of a vehicle to receive data from the transmitters. The invention also relates to a method of monitoring communication states between the transmitters and the receivers.

Wireless tire air pressure monitoring apparatuses for allowing a driver to check the air pressures of vehicle tires have been proposed. Such a monitoring apparatus includes transmitters installed on the wheels of the respective tires and a receiver mounted on the body frame of the vehicle. Each transmitter measures the air pressure of the associated tire and wirelessly transmits data including the measured pressure value. The receiver receives data transmitted from the transmitters and displays information about the air pressure of each tire on a display located in front of the driver's seat.

In general, each transmitter measures the air pressure of the associated tire at predetermined time intervals (e.g., fifteen seconds). The transmitter also regularly transmits data every time the air pressure has been measured a predetermined number of times (e.g., forty times). If the interval for measuring the air pressure is fifteen seconds, therefore, the transmitter transmits data at intervals of ten minutes. When the air pressure of the tire changes abruptly, however, the transmitter performs data transmission a predetermined number of times (e.g., four times) in succession in accordance with the interval for measuring the air pressure. That is, the transmitter operates in accordance with a regular transmission mode according to a predetermined transmission interval and an abnormal transmission mode, which is executed when the air pressure of the associated tire is abnormal.

Wireless communication between the transmitters and the receiver is less reliable than wired communication. This is particularly so for an air pressure monitoring apparatus, which is mounted on a vehicle with a metal body. The metal body is likely to affect radio waves. What is more, because each transmitter is installed on an associated tire, the positional relationship of the transmitter with respect to the receiver changes quickly as the vehicle moves. As the transmission antenna of the transmitter and the reception antenna of the receiver both have directivities, the reception precision significantly changes when the vehicle moves.

One way of improving the reliability of communication is to increase the output level of the radio waves. Because the output level of the radio waves is restricted by communication laws, however, the output level of radio waves is limited.

It is therefore important for an air pressure monitoring apparatus to always monitor the communication state between each transmitter and the receiver.

A conventional air pressure monitoring apparatus discriminates if communication is carried out normally by causing the receiver to monitor the data reception interval. When the transmitter is operating in regular transmission mode, for example, the receiver determines if communication is normal or abnormal based on whether or not data has been received at regular time intervals.

When the transmitter is operating in abnormal transmission mode, however, the receiver cannot determine whether data transmission according to the abnormal transmission mode has been carried out properly or if data sent in the abnormal transmission mode has surely been received. That is, the receiver can easily determine if data has been received at regular time intervals but cannot detect, otherwise, if data transmission according to the abnormal transmission mode has been performed unless it actually receives data. When there is an abnormality in the pressure, when data transmission has not been executed due to a failure in the transmitter or when transmission data from the transmitter has not been received due to a poor communication environment, the receiver cannot detect the communication failure or the abnormality.

The deterioration of the communication environment that prevents data reception is often temporary. When the communication environment improves, therefore, the receiver can resume reception of data from each transmitter. When the received data has been transmitted in the abnormal transmission mode, however, the receiver cannot determine whether or not there has been any unreceived data before reception of that data. This delays the detection of a communication failure, which reduces the reliability of the air pressure monitoring apparatus.

SUMMARY OF THE INVENTION

Accordingly, it is an objective of the present invention to provide a tire air pressure monitoring apparatus and monitoring method which can accurately and reliably determine the communication state between each transmitter and a receiver.

To achieve the above objective, the present invention provides a tire air pressure monitoring apparatus having a transmitter for wirelessly transmitting data concerning the internal pressure of a tire on a vehicle and a receiver for receiving the data. The apparatus comprises generation means provided in the transmitter and determination means provided in the receiver. The generation means assigns a value to a variable according to a predetermined sequence every time the transmitter sends data. The transmitted data includes a current value of the variable. The determination means determines whether there has been a communication failure based on the value of the variable in the received data.

Also, the present invention provides a method of monitoring a communication state between a transmitter and a receiver. The method comprises: assigning a value to a variable in accordance with a predetermined sequence every time the transmitter sends data, wherein the transmitted data represents at least a physical status and the current value of the variable; receiving data with the receiver; and determining whether there has been a communication failure based on the value of the variable in the received data.

The present invention further provides a method of monitoring communication states among a plurality of transmitters and a receiver. The method comprises: assigning, for each transmitter, a value to a variable in accordance with a predetermined sequence every time each transmitter sends data, wherein the transmitted data represents at least a physical status and the current value of the variable; receiving data with the receiver; finding a number of skipped receptions between the previous data reception and the current data reception for each transmitter based on the variable values in the associated data; and determining whether each transmitter is malfunctioning by analyzing the numbers of skipped receptions for all of the transmitters.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5(a) is a timing chart for explaining a regular transmission mode;

FIG. 5(b) is a timing chart for explaining an abnormal transmission mode;

FIG. 8 is a diagram exemplifying a table provided in a controller in the receiver.

DETAILED DESCRIPTION OF THE PREFERRED EMBODIMENTS

A tire air pressure monitoring apparatus according to a first embodiment of the present invention will now be described referring to FIGS. 1 through 8.

Figure 1:
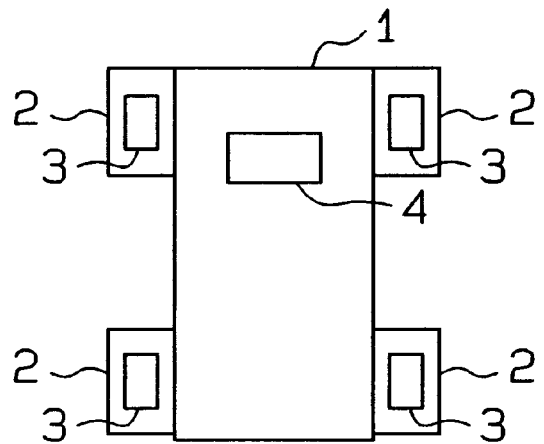
FIG. 1 is a schematic structural diagram illustrating a tire air pressure monitoring apparatus according to one embodiment of this invention.

As shown in FIG. 1, the tire air pressure monitoring apparatus includes four transmitters 3, each located in one of four tires 2 of a vehicle 1, and a receiver 4 mounted on the body frame of the vehicle 1. Each transmitter 3 is secured to the wheel of the associated tire 2 in such a way that the transmitter 3 is located inside the associated tire 2. Each transmitter 3 measures the internal air pressure of the associated tire 2 and sends a signal containing the measured pressure data to the receiver 4.

Figure 2:
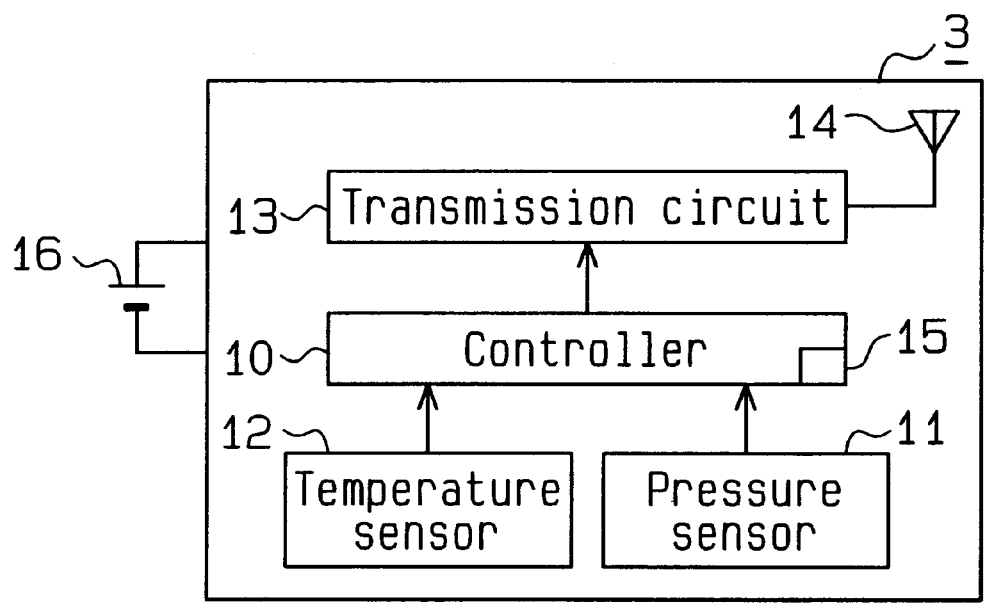
FIG. 2 is a block circuit diagram showing a transmitter in the monitoring apparatus in FIG. 1.

As shown in FIG. 2, each transmitter 3 includes a controller 10, which includes a microcomputer or the like. Each controller 10 includes, for example, a central processing unit (CPU), a random access memory (RAM) and a read only memory (ROM). A specific ID code is registered in advance in each controller 10. The ID codes are used to identify the respective four transmitters 3.

Though the following description refers to just one transmitter 3, the transmitters 3 are identical, and the description applies to each. A pressure sensor 11 measures the internal air pressure of the associated tire 2 and sends the measured pressure data to the controller 10. A temperature sensor 12 measures the internal temperature of the associated tire 2 and outputs the measured temperature data to the controller 10.

The controller 10 sends data including the pressure data, the temperature data and its ID code to a transmission circuit 13. The transmission circuit 13 encodes and modulates the data sent from the controller 10 and then wirelessly transmits the data to the receiver 4 via a transmission antenna 14.

The controller 10 has a counter 15 that serves as generation means for generating a variable value, which is sequentially updated every time data is transmitted from the transmitter 3. Specifically, the counter 15 increments the count value by one within a range of, for example, zero to fifteen every time data transmission is performed. When the count value reaches fifteen, the counter 15 resets the count value to zero at the time of the next data transmission. When transmitting, the controller 10 sends data representing the count value set in the counter 15 to the transmission circuit 13. Therefore, the transmitted data includes data indicating the count value.

A battery 16 is the power source for the transmitter 3. That is, the transmitter 3 operates on power from the battery 16. The controller 10 detects the voltage of the battery 16 and sends the detected voltage data to the transmitter 3. Therefore, the transmitted data also includes data indicating the voltage.

Figures 3, 4:
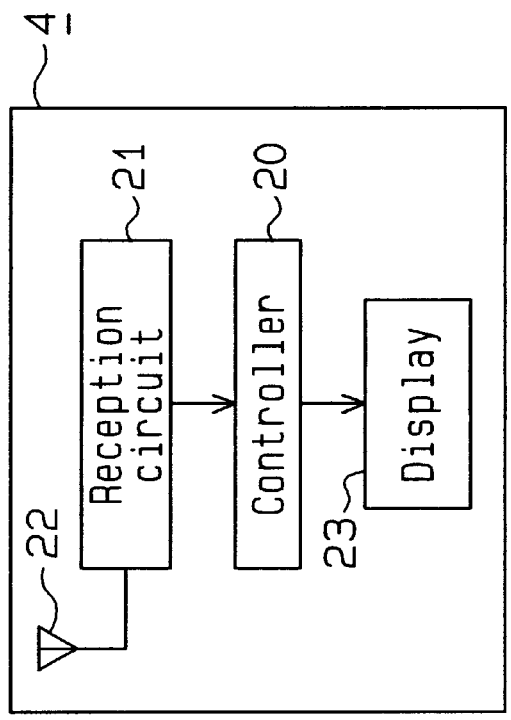
FIG. 3 is a block circuit diagram showing a receiver in the monitoring apparatus in FIG. 1.
FIG. 4 is a diagram of data transmitted from the transmitter.

The transmitted data from the transmitter 3 is constructed, for example, as shown in FIG. 4. The transmitted data includes sync data, an ID code, pressure data, temperature data, voltage data, count value data and an error detection code. The sync data indicates the start of the transmission data and the error detection code is used to determine if the transmission data is normal. Each of the seven types of data included in the transmission data consists of a binary code of a predetermined number of bits. For example, the count value data consists of a binary code of 4 bits and is able to represent sixteen values from zero to fifteen.

As shown in FIG. 5(a), the controller 10 commands the pressure sensor 11 and the temperature sensor 12 to take a measurement at every predetermined time interval t1 (fifteen seconds in this embodiment). The controller 10 counts the number of measurements and commands the transmission circuit 13 to carry out transmission when that number reaches a predetermined number (forty in this embodiment). In other words, the controller 10 causes the transmission circuit 13 to transmit data after each predetermined time interval t2, or every ten minutes (fifteen seconds times forty), as shown in FIG. 5(a).

The controller 10 normally commands the transmission circuit 13 to perform transmission at regular transmission intervals t2 mentioned above. When an abrupt change in the internal air pressure of the associated tire 2 based on the pressure data from the pressure sensor 11 has been detected, however, the controller 10 commands the transmission circuit 13 to perform transmission at the measuring intervals t1 of fifteen seconds a predetermined number of times (four in this embodiment) as shown in FIG. 5(b), regardless of the regular transmission at interval t2. The transmitter 3 therefore executes a regular transmission mode for transmission at the regular time intervals t2 and an abnormal transmission mode for transmission at the time intervals t1, which are shorter than the time intervals t2.

The abnormal transmission mode may also be executed when an abnormal rise in the internal temperature of the tire is detected based on the temperature data from the temperature sensor 12.

As shown in FIG. 3, the receiver 4 includes a controller 20 which includes a microcomputer or the like. The controller 20, which serves as a determination means, includes a CPU, an RAM and an ROM, for example. A reception circuit 21 receives data transmitted from each transmitter 3 through a reception antenna 22 and sends the data to the controller 20 after demodulating and decoding the data. Based on the received data, the controller 20 determines the internal air pressure and temperature of the tire 2 corresponding to the transmitter 3 that has sent the data.

The controller 20 also displays the tire air pressure and other desired information on a display 23. The display 23 is located within the field of view of the driver in the vehicle 1. The receiver 4 is activated, for example, when the ignition key (not shown) the vehicle 1 is turned on.

Figure 6:
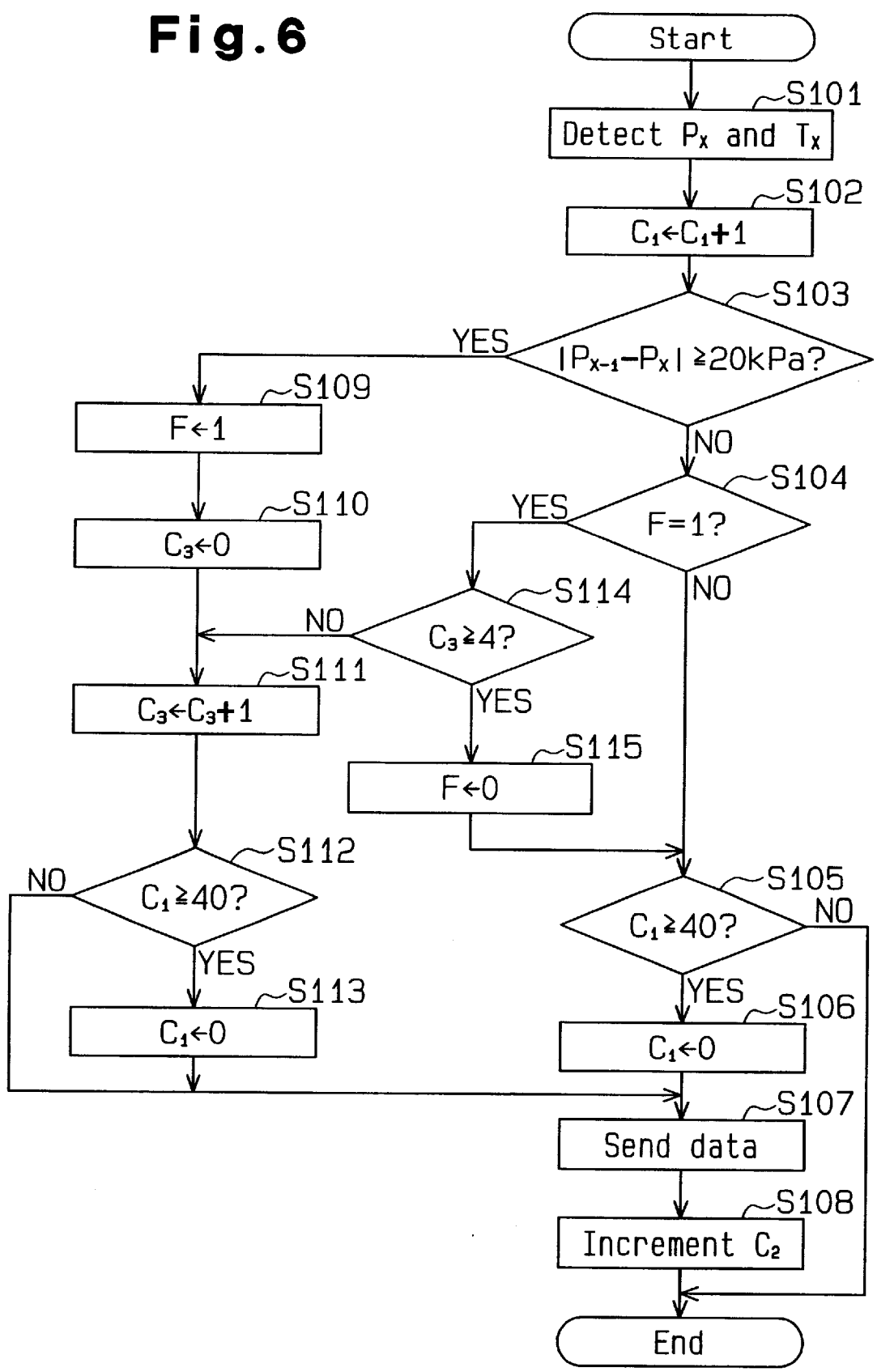
FIG. 6 is a flowchart for explaining the operation of the transmitter.

The operation of each transmitter 3 will now be described with reference to the flowchart in FIG. 6. The controller 10 repeatedly performs the routine illustrated in FIG. 6 every fifteen seconds, which is the measuring interval t1.

First, at step S101, the controller 10 detects the pressure $P_x$ in the tire 2 by the pressure sensor 11 and detects the temperature $T_x$ in the tire 2 by the temperature sensor 12. At the same time, the controller 10 detects the voltage of the battery 16.

At the next step S102, the controller 10 increments a first count value $C_1$ by one and sets the resultant value as a new first count value $C_1$. The first count value $C_1$ represents the number of times the pressure sensor 11 has taken a measurement.

At step S103, the controller 10 determines if the absolute value of the difference between the air pressure $P_{x-1}$ previously detected and the air pressure $P_x$ currently detected is equal to or greater than a predetermined value (twenty kPa in this embodiment). In other words, the controller 10 judges whether or not the pressure in the associated tire 2 has changed by an amount equal to or greater than twenty kPa during an interval of fifteen seconds, or during the time from the previous pressure detection to the current pressure detection.

If the decision at step S103 is negative, the controller judges that no abrupt change has occurred in the air pressure of the tire 2, and moves to step S104. At step S104, the controller 10 determines whether an abnormal transmission flag F is set to one. If the abnormal transmission flag F is not one (if the flag F is set to zero) the controller 10 judges that the abnormal transmission mode has not been set and proceeds to step S105.

At step S105, the controller 10 determines whether the first count value $C_1$ has reached forty, i.e., whether the pressure sensor 11 has measured the pressure in the tire 2 forty times. If the first count value $C_1$ has not reached forty yet, the controller 10 judges that the transmission interval t2, which is ten minutes, has not yet passed and temporarily terminates this routine. If the first count value $C_1$ has reached forty, the controller 10 judges that the transmission interval t2, which is 10 minutes, has passed and moves to step S106 to re set the first count value $C_1$ to zero and then moves to step S107.

At step S107, the controller 10 commands the transmission circuit 13 to transmit the data shown in FIG. 4. That is, the transmission circuit 13 transmits data representing the current air pressure $P_x$, among other things, in accordance with the regular transmission mode as shown in FIG. 5(a).

At the subsequent step S108, the controller 10 increments the count value of the counter 15, or a second count value $C_2$, by one and then temporarily terminates this routine.

If the decision at step S103 is positive, the controller 10 judges that the air pressure of the tire 2 has changed abruptly in a short period of time, and moves to step S109. At step S109, the controller 10 sets the abnormal transmission flag F to one to execute the abnormal transmission mode.

At next step S110, the controller 10 resets a third count value $C_3$, which indicates the number of data transmissions carried out according to the abnormal transmission mode, to zero. Then, the controller 10 adds one to the third count value $C_3$ and sets the resultant value as a new third count value $C_3$ at step S111.

At step S112, the controller 10 determines whether the first count value $C_1$ has reached forty. If the first count value $C_1$ has reached forty, the controller 10 resets the first count value $C_1$ at step S113 and proceeds to the aforementioned step S107 to transmit data according to the abnormal transmission mode. If the first count value $C_1$ has not reached forty yet, on the other hand, the controller 10 proceeds to step S107 without resetting the first count value $C_1$.

At step S107, therefore, the transmission circuit 13 sends data of the currently detected air pressure $P_x$ regardless of the regular transmission at the time interval t2 as shown in FIG. 5(b). As apparent from the above, when a relatively abrupt change in the air pressure of the tire 2 is detected, data is transmitted according to the abnormal transmission mode to instantly report the abnormal air pressure of the tire 2.

When the state of the abnormal transmission flag F is one at the aforementioned step S104, the controller 10 judges that the transmitter 3 is in the abnormal transmission mode and moves to step S114.

At step S114, the controller 10 determines whether the third count value $C_3$ has reached four. If the third count value $C_3$ has not yet reached four, the controller 10 executes step S111 to resume data transmission according to the abnormal transmission mode.

If the third count value $C_3$ has reached four at the step S114, the controller 10 sets the abnormal transmission flag F to zero to cancel the abnormal transmission mode and proceeds to the aforementioned step S105.

As described above, every time data is transmitted according to the regular transmission mode or the abnormal transmission mode, the count value of the counter 15, or the second count value $C_2$, is incremented by one within the range of zero to fifteen. Therefore, the count value data in the transmission data shown in FIG. 4 is changed by one within the range of zero to fifteen every time data is transmitted.

The operation of the receiver 4 will now be described with reference to the flowchart in FIG. 7. The controller 20 in the receiver 4 executes a separate main routine (not shown) for monitoring the presence or absence of reception data and performs the routine in FIG. 7 when data reception is detected in this main routine.

First, at step S201, the controller 20 analyzes the received data. In subsequent step S202, the controller 20 determines if the received data is adequate based on the analysis of the received data. This step S202 includes deciding whether the received data represents an unwanted signal such as a noise signal.

When the received data is abnormal, the controller 20 temporarily terminates the routine. When the received data is normal, the controller 20 goes to step S203 to judge whether the ID code included in the received data matches with a registered ID code previously registered in the controller 20.

The controller 20 has a table, for example, as shown in FIG. 8, where the four ID codes respectively assigned to the four transmitters 3 (shown as first to fourth transmitters #1–#4 in FIG. 8) provided on the vehicle 1 have previously been registered. Those four ID codes registered in the table in the controller 20 are called the registered ID codes.

When the ID code included in the received data is not a registered ID code, the controller 20 regards the received data as not having come from one of the transmitters 3 mounted on the vehicle 1 and temporarily terminates the routine. Therefore, if the receiver 4 receives data from the transmitter of an air pressure monitoring apparatus mounted on another vehicle, the data will not be processed.

When the ID code included in the received data is a registered ID code, on the other hand, the controller 20 regards the received data as having come from one of the transmitters 3 mounted on the vehicle 1 and proceeds to step S204. At step S204, the controller 20 stores the second count value $C_2$, derived from the count value data in the received data, in the table in FIG. 8 in association with the received ID code.

In the example of FIG. 8, fourteen is stored as the current second count value $C_2$ in association with the received ID code of the first transmitter #1. The controller 20 stores at least the second count value $C_2$ received currently and the second count value $C_2$ received previously as shown in the table in FIG. 8.

At next step S205, the controller 20 determines whether a value resulting from adding one to the previous second count value $C_2$ is equal to the current second count value $C_2$. If the decision is positive, the controller 20 judges that the current second count value $C_2$ has been renewed in order and there has been no skipped receptions between the previous data reception and the current data reception and proceeds to step S206.

This will be discussed specifically according to the example in FIG. 8. When the received data has been sent from the fourth transmitter #4, for example, the previous second count value $C_2$ is eight and the current second count value $C_2$ is nine so the decision at step S205 is positive. Since the transmitter 3 increments the second count value $C_2$ by one every time it sends data, the fact that the previous second count value $C_2$ is eight and the current second count value $C_2$ is nine means that data from the fourth transmitter #4 has properly been received in order, without any skipping.

At step S206, the controller 20 stores the number of skipped receptions E as zero in the table in FIG. 8 in association with the received ID code. At the subsequent step S207, the controller 20 carries out the normal processing based on the received data and then temporarily terminates the routine. Specifically, based on the received data, the controller 20 displays the internal air pressure of the tire 2 associated with the transmitter 3 that sent that data and other necessary information on the display 23. If the transmission data has been sent in the abnormal transmission mode, in particular, a warning may be issued to indicate the abnormality of the air pressure of the tire.

If the decision at the step S205 is negative, on the other hand, the controller 20 judges that the current second count value $C_2$ has not been received in order, and a reception was skipped between the previous data reception and the current data reception, and the controller 20 then proceeds to step S208. At step S208, the controller 20 calculates the skipped reception number E based on the previous second count value $C_2$ and the current second count value $C_2$ and stores the resulting number E in the table in FIG. 8 in association with the received ID code.

This will be discussed specifically according to the example in FIG. 8. When the received data has been sent from the first transmitter #1, for example, the previous second count value $C_2$ is nine and the current second count value $C_2$ is fourteen and the decision at step S205 is negative. In this case, data corresponding to the second count values $C_2$ of ten, eleven, twelve and thirteen have not been received and the skipped reception number E is four.

Next, the controller 20 determines at step S209 whether the computed skipped reception number E is equal to or greater than a predetermined upper limit (four in this embodiment). If the skipped reception number E is not equal to or greater than four, the controller 20 regards the incident simply as temporary poor communication, not a communication failure, and moves to step S207. In this case, the skipped reception number E may be displayed on the display 23 at step S207.

If the skipped reception number E is equal to or greater than four, on the other hand, the controller 20 proceeds to step S210 and selects a maximum value Emax and a minimum value Emin from the skipped reception numbers E corresponding to the four transmitters 3, referring to the table in FIG. 8. Then, the controller 20 determines if the difference between the maximum value Emax and the minimum value Emin is equal to or greater than a predetermined value (three, in this embodiment).

If the difference between the maximum value Emax and the minimum value Emin is not equal to or greater than three, the controller 20 judges that there has been a communication failure with the transmitter 3 that has a skipped reception number E equal to or greater than four and proceeds to step S211 to execute a process based on the communication failure and then temporarily terminates the routine. Specifically, based on the received data, the controller 20 displays the internal air pressure and other desired information of the associated tire 2 and indicates the occurrence of a communication failure on the display 23 to warn the driver.

If the difference between the maximum value Emax and the minimum value Emin is equal to or greater than three, on the other hand, the controller 20 judges that the transmitter 3 associated with the maximum value Emax may be malfunctioning and moves to step S212 to execute a process based on the malfunction of the transmitter 3. Then, the controller 20 temporarily terminates the routine. Specifically, based on the received data, the controller 20 displays the internal air pressure and other desired information of the associated tire 2 and indicates the possible malfunctioning of the transmitter 3 on the display 23 to warn the driver.

In the example in FIG. 8, because the maximum value Emax of the skipped reception number E is four and the minimum value Emin thereof is zero, the decision at step S210 is positive and the first transmitter #1, the skipped reception number E of which is equal to or greater than four, is regarded as possibly malfunctioning.

As specifically discussed above, each transmitter 3 generates the variable value, or the second count value $C_2$, which is incremented every time data is sent. This second count value $C_2$ is transmitted to the receiver 4 as part of the transmitted data. The receiver 4 determines whether there is a communication failure based on the second count value $C_2$.

Specifically, the receiver 4 determines if any receptions have been missed, or skipped, prior to the current reception based on whether the second count value $C_2$ is in sequence with respect to that of the last reception. When the skipped reception number E is equal to or greater than the upper limit value of four, the receiver 4 judges that there is a communication failure, whereas when the skipped reception number E is less than four, the receiver 4 judges that there is no communication failure.

Therefore, regardless of whether the transmitter 3 is operating in the regular transmission mode or the abnormal transmission mode, the presence or absence of a communication failure can be determined easily and reliably based on the second count value $C_2$ included in the received data. Even when the received data has been sent in the abnormal transmission mode, the receiver 4 can accurately determine if any receptions were missed before that data reception. This permits detection of a communication failure as early as possible and improves the reliability of the air pressure monitoring apparatus.

A wireless air pressure monitoring apparatus will normally miss a reception once in a while, and this is not considered to be a communication failure. It is therefore possible to more accurately judge the presence or absence of a communication failure by determining failure only when the skipped reception number E between the previous data reception and the current data reception is equal to or greater than a predetermined upper limit value.

When the difference between the maximum value Emax of the skipped reception number E and the minimum value Emin thereof is equal to or greater than three, it is judged that the transmitter 3 associated with the maximum value Emax may be malfunctioning. That is, when only the skipped reception number E that corresponds to a specific one of the plurality of transmitters 3 is large as compared with those corresponding to the other transmitters 3, the transmitter 3 that has a large skipped reception number E can be considered to be malfunctioning. It is possible to more specifically diagnose a failure in the air pressure monitoring apparatus by judging malfunctioning of each transmitter 3. This can further improve the reliability of the air pressure monitoring apparatus.

The display 23 provided on the receiver 4 is effective to inform the driver of the vehicle 1 of a communication failure or a malfunction of a transmitter 3.

As described above, the air pressure monitoring apparatus according to this embodiment can accurately and reliably monitor the communication state between each transmitter 3 and the receiver 4.

This invention is not limited to the above-described embodiment, but may be modified in the following forms.

Although the second count value $C_2$ can have one of sixteen values from zero to fifteen in the embodiment illustrated in FIGS. 1 to 8, the count value $C_2$ may have more or less than sixteen possible values. If the second count value $C_2$ has less than sixteen possible values, the number of bits in the count value data of the transmitted data can be reduced. If the second count value $C_2$ has more than sixteen possible values, the number of skipped receptions can be detected reliably even if the skipped reception number is large.

The second count value $C_2$ need not be incremented by one every time data is transmitted, but may be updated in other ways as long as it is updated according to a predetermined order.

Since the second count value $C_2$ is renewed according to a predetermined order, the second count value $C_2$ can be used as an extension code of the ID code. This modification allows each ID code to be constructed as a variable code that regularly varies with the passage of time.

It is hardly possible to make the ID codes of all the transmitters 3 provided on a tremendous number of vehicles 1 different from one another. This means that the receiver 4 may erroneously process data sent from a transmitter 3 mounted on another vehicle 1. To avoid this, the number of bits in each ID code should be very large. The use of the second count value $C_2$ as an extension code of the ID code however can reduce the probability that different transmitters 3 will have the same ID code while decreasing the number of bits in each ID code as much as possible.

Figure 7:
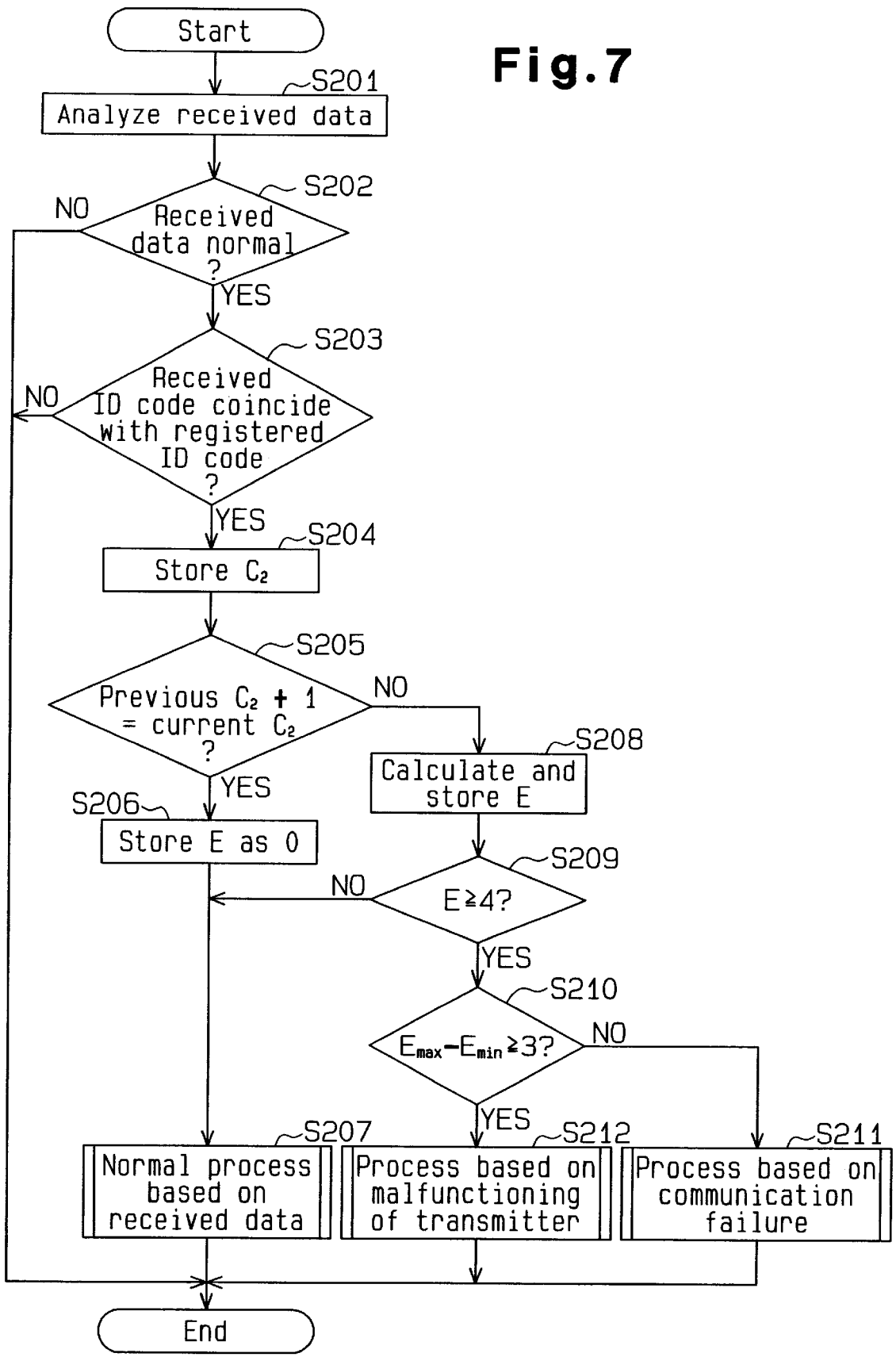
FIG. 7 is a flowchart for explaining the operation of the receiver.

Although the decision at step S210 is made when the decision at step S209 is positive in the flowchart of FIG. 7, the process at step S210 may be executed regardless of the result of the decision at step S209.

The present examples and embodiments are to be considered as illustrative and not restrictive and the invention is not to be limited to the details given herein, but may be modified within the scope and equivalence of the appended claims.

What is claimed is:

1. A tire air pressure monitoring apparatus having a transmitter for wirelessly transmitting data concerning the internal pressure of a tire on a vehicle and a receiver for receiving the data, the apparatus comprising:

generation means, provided in the transmitter, for assigning a value to a variable according to a predetermined sequence every time the transmitter sends data, wherein the transmitted data includes a current value of the variable; and determination means, provided in the receiver, for determining whether there has been a communication failure based on the value of the variable in the received data.

2. The monitoring apparatus according to claim 1, wherein the determination means determines whether there has been a communication failure based on whether or not the value of the variable in the received data has been updated in accordance with the predetermined sequence.

3. The monitoring apparatus according to claim 1, wherein the determination means determines whether there has been a communication failure by comparing a previous value of the variable with the value of the variable in the most recently received data.

4. The monitoring apparatus according to claim 1, wherein the determination means determines the number of missed receptions between the previous data reception and the current data reception based on the previous and most recent values of the variable and judges that a communication failure has occurred when the number of missed receptions is equal to or greater than a predetermined upper limit value.

5. The monitoring apparatus according to claim 1, wherein the vehicle has a plurality of tires, the transmitter is one of a plurality of substantially identical transmitters, and one of the transmitters is located in each tire, and the determination means determines the number of receptions that were missed between the previous data reception and the current data reception for each transmitter based on the values of the variable in the corresponding data and determines whether each transmitter is malfunctioning by analyzing the numbers of missed receptions of all of the transmitters.

6. The monitoring apparatus according to claim 5, wherein the determination means selects a maximum value and a minimum value from the numbers of missed receptions and determines that the transmitter associated with the maximum value is malfunctioning when the difference between the maximum value and the minimum value is equal to or greater than a predetermined value.

7. The monitoring apparatus according to claim 1, wherein the receiver has a display for displaying the result of the determination made by the determination means.

8. A method of monitoring a communication state between a transmitter and a receiver, the method comprising:

assigning a value to a variable in accordance with a predetermined sequence every time the transmitter sends data, wherein the transmitted da-a represents at least a physical status and the current value of the variable;

receiving data with the receiver; and determining whether there has been a communication failure based on the value of the variable in the received data.

9. The method according to claim 8, wherein the determination step includes determining whether there has been a communication failure based on whether or not the value of the variable in the received data has been updated in accordance with the predetermined sequence.

10. The method according to claim 8, wherein the determination step includes determining whether there has been a communication failure by comparing the variable value in previously received data with that in currently received data.

11. The method according to claim 8, wherein the determination step includes:

finding a number of skipped receptions between the previous data reception and the current data reception based on the variable values of the previous and current data; and judging that a communication failure has occurred when the number of skipped receptions is equal to or greater than a predetermined upper limit value.

12. The method according to claim 8, further comprising the step of displaying the result of the determination.

13. A method of monitoring communication states among a plurality of transmitters and a receiver, the method comprising:

assigning, for each transmitter, a value to a variable in accordance with a predetermined sequence every time each transmitter sends data, wherein the transmitted data represents at least a physical status and the current value of the variable;

receiving data with the receiver;

finding a number of skipped receptions between the previous data reception and the current data reception for each transmitter based on the variable values in the associated data; and determining whether each transmitter is malfunctioning by analyzing the numbers of skipped receptions for all of the transmitters.

14. The method according to claim 13, wherein the determination step includes:

selecting a maximum value and a minimum value from the numbers of skipped receptions; and judging that the transmitter associated with the maximum value is malfunctioning when the difference between the maximum value and the minimum value is equal to or greater than a predetermined value.

15. The method according to claim 13, further comprising the step of displaying a result of the determination.

* * * * *